United States Patent [19]

Thompson

[11] 4,292,862
[45] Oct. 6, 1981

[54] METHOD AND APPARATUS FOR PRODUCTION OF A STREAM FEEDER

[75] Inventor: Thomas K. Thompson, Granville, Ohio

[73] Assignee: Owens-Corning Fiberglas Corporation, Toledo, Ohio

[21] Appl. No.: 74,585

[22] Filed: Sep. 12, 1979

[51] Int. Cl.³ .............................................. B21K 5/20
[52] U.S. Cl. ...................................... 76/4; 76/107 R; 76/107 S; 83/33; 83/451; 83/36
[58] Field of Search ............... 76/107 R, 107 S, 4; 83/33, 175, 18, 176, 414, 451, 620, 691, 692, 36; 408/3, 70

[56] References Cited

U.S. PATENT DOCUMENTS

| 915,042 | 3/1909 | Robinson | 83/620 |
| 942,104 | 12/1909 | Robinson | 83/33 |
| 1,124,549 | 1/1915 | Stephenson | 408/70 |
| 1,962,432 | 6/1934 | Daley | 83/620 |
| 1,995,466 | 3/1935 | Bishop | 83/620 |
| 2,776,712 | 1/1957 | Carlson | 83/33 |
| 2,781,096 | 2/1957 | Garity | 83/451 |
| 3,107,566 | 10/1963 | Archer | 83/33 |
| 3,459,087 | 8/1969 | Weisner | 83/451 |
| 3,860,803 | 1/1975 | Levine | 76/107 R |

Primary Examiner—James M. Meister
Assistant Examiner—K. Bradford Adolphson
Attorney, Agent, or Firm—Ronald C. Hudgens; Philip R. Cloutier; Kenneth H. Wetmore

[57] ABSTRACT

The present invention embraces the method of, and apparatus for, producing a stream feeder for flowing streams of molten mineral material, such as glass, from which filaments are attenuated comprising positioning a workpiece such that a pin enters a first locating hole of a set of locating holes, forming a first group of orificed projections in the workpiece, subsequently positioning the workpiece such that the pin enters a second locating hole of the set and forming a second group of orificed projections in the workpiece.

5 Claims, 6 Drawing Figures

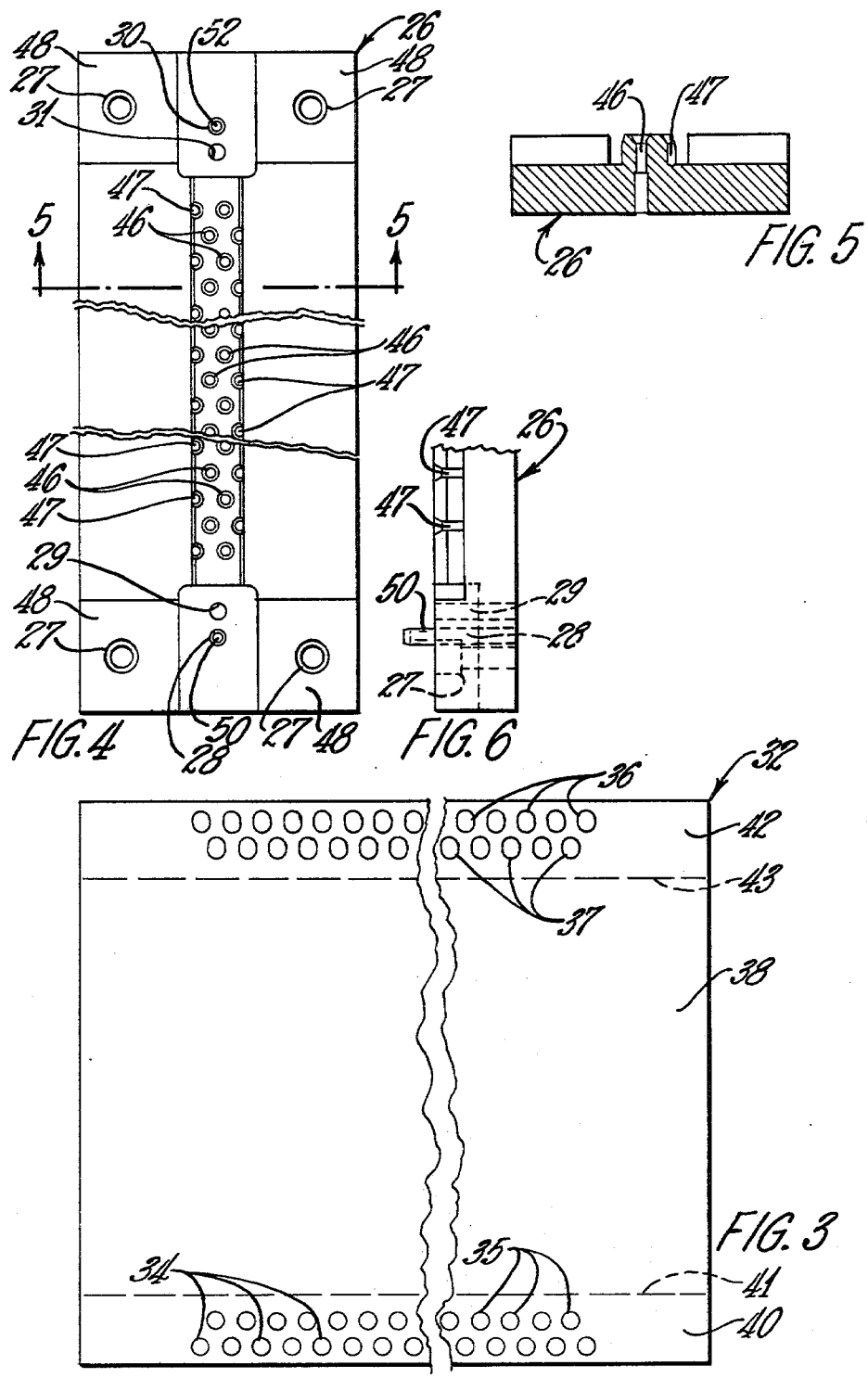

METHOD AND APPARATUS FOR PRODUCTION OF A STREAM FEEDER

TECHNICAL FIELD

The invention relates to method and apparatus for producing a stream feeder for flowing streams of molten material, such as glass, from which filaments are attenuated.

BACKGROUND ART

When producing synthetic fibers or filaments and particularly synthetic continuous filaments usable as textiles from heat softened mineral material, such as molten glass or the like, it is conventional practice to use a stream feeder or bushing. Such feeders are normally made of platinum alloy and have a bottom wall with a plurality of orificed projections through which pass streams of heat softened mineral material. Suitable apparatus attenuates the streams into continuous fibers or filaments.

Stream feeders have been produced by a number of methods in the past. One method has been used to use a punching operation. In this method a plate having a slightly oversized thickness is stamped by a blister die. The blister die has a series of projections corresponding to the number and pattern of the desired orificed projections in the final stream feeder. The stamping of the plate by the blister die forms a plurality of raised portions on one side of the plate. The plurality of raised portions thus becomes the pattern for further production of the orificed projections in the plate. A punch press operator uses these raised portions as a guide when he carries out the punching operations to form orificed projections at each of the raised areas.

The deficiencies of the prior art stream feeder fabrication method as described above become more acute under modern filament-forming conditions. This method is very operator-dependent. This can be a problem as bushings today often have increased numbers of orificed projections, such as 2,000 or more. Also, there is a difficulty with this method in producing stream feeders which have a relatively high orifice density, as the plate elongates during punching. As the plate elongates, an operator can have difficulty properly aligning the plate within the punching press, which can result in defective base plates. Another difficulty with the blister die method of forming stream feeders is that an entirely new blister die must be produced for every desired base plate which has a different number of orificed projections or which has a different pattern of orificed projections.

SUMMARY OF THE INVENTION

The present invention comprises a method of, and apparatus for, producing a stream feeder for flowing streams of molten mineral material, such as glass, from which filaments are attenuated comprising positioning a workpiece such that a pin enters a first locating hole of a set of locating holes, forming a first group of orificed projections in the workpiece, subsequently positioning the workpiece such that the pin enters a second locating hole of the set and forming a second group of orificed projections in the workpiece.

The present invention comprises a method of, and apparatus for, producing a stream feeder for flowing streams of molten glass material from which glass filaments are attenuated comprising providing two locating pins, providing a workpiece which has a first and second set of locating holes wherein each set has one row of round holes and one row of elongated holes, locating the workpiece such that one of the pins enters a first round hole of the first set and the other pin enters a first elongated hole of the first set, punching a first row of orificed projections in the workpiece between the first round hole and the first elongated hole of the first set, subsequently locating the workpiece such that one of the pins enters a second round hole of the first set and the other pin enters a second elongated hole of the first set, punching a second row of orificed projections in the workpiece between the second round hole and the second elongated hole of the first set, subsequently locating the workpiece such that one of the pins enters a first round hole of the second set and the other pin enters a first elongated hole of the second set, punching a third row of orificed projections in the workpiece between the first round hole and the first elongated hole of the second set, the third row of orificed projections being located between the first row and the second row and trimming from the workpiece a portion which contains the round holes and a portion which contains the elongated holes.

An object of the invention is an improved method of producing a stream feeder for flowing streams of molten mineral materials, such as glass, from which filaments are attenuated.

Another object of the invention is an improved apparatus for producing a stream feeder for flowing streams of molten mineral material, such as glass, from which filaments are attenuated.

These and other objects of the invention will become more apparent as the invention is described hereinafter in detail with reference to the accompanying drawings.

DESCRIPTION OF THE DRAWINGS

FIG. 3 is a top view of the workpiece in accordance with the present invention.

FIG. 4 is a top view of the extruding die of the punch assembly shown in FIG. 1.

FIG. 5 is a sectional view of the extruder die through section 5—5 of FIG. 4.

FIG. 6 is a partial side view of the extruding die of FIG. 4.

DESCRIPTION OF THE PREFERRED EMBODIMENTS

Before explaining the present invention in detail, it is to be understood that the invention is not limited in application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

Figure 1:
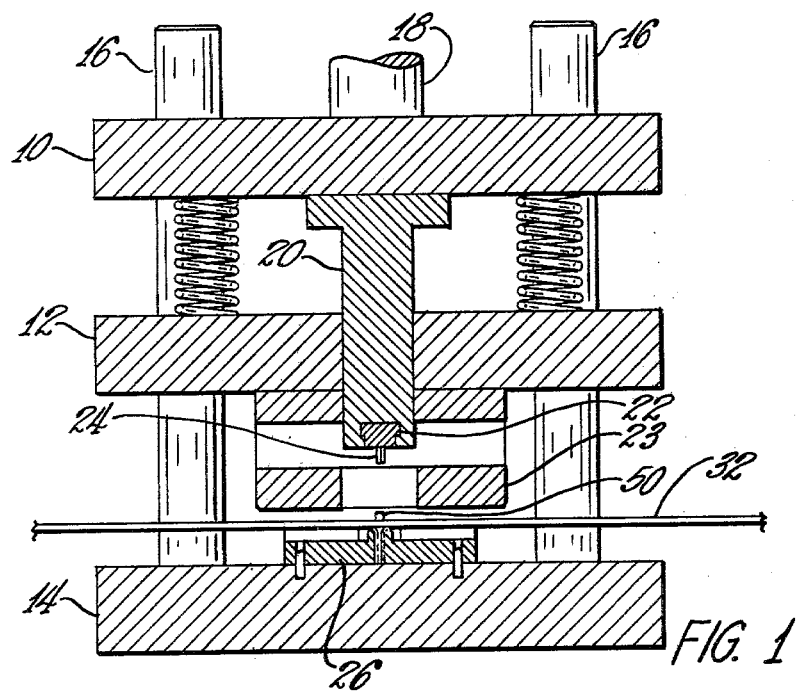
FIG. 1 is a front view of a punch press assembly in accordance with the present invention.
Figure 2:
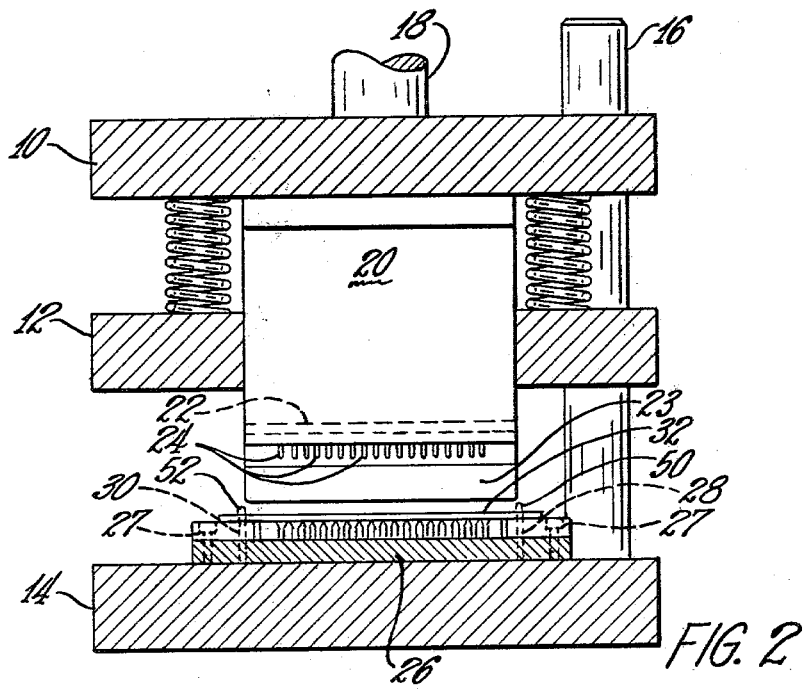
FIG. 2 is a side view of the punch press assembly of FIG. 1.

Referring to the drawings in detail, FIGS. 1 and 2 illustrate a conventional punch press machine. An extruding die 26 is positioned on bottom die shoe 14. The extruder die has locating holes 28 and 30 for receiving locating pins 50 and 52, respectively. Holes 27 are used for holding the extruder die to the bottom shoe. The extruding die will be discussed in more detail later. Workpiece 32 is positioned in the punch press by the locating pins as will be discussed in more detail.

The upper portion of the punch press comprises upper die shoe 10 and middle die shoe 12 which are guided up and down by guide pins 16. Ram 18 moves the upper and middle die shoes up and down by conventional hydraulic means (not shown). The punches 24 are positioned in punch nest 22 which is secured in punch nest holder 20. This punch nest assembly is secured to the upper die shoe.

In operation, the ram moves the upper assembly downward such that pressure plate 23 moves against the workpiece and holds the workpiece securely between the pressure plate and the extruding die. The punches are then brought into contact with the workpiece for the formation of the orificed projections in the workpiece. During operation of the punching procedure, it is conventional to use a series of punches to form the orificed projections. For example, a dome punch can be used first to form the general shape of the projection. Next, a lead punch can be used to further define the shape of the projection. After that, a piercing punch can be used to open the projection, and then, a sizing punch can be used to obtain the desired orifice shape.

FIGS. 4 through 6 show the extruding die in more detail. It is conventional to use an extruding die in forming the projection as the workpiece is punched or formed. As can be seen, the exturding die shown is for punching two rows of orificed projections at one time. Also, it should be noted that the punches shown in FIGS. 1 and 2 are such that two rows of orificed projections are produced at one time. Producing two rows of projections at a time is shown only as an example as one row or more than two rows can be produced. Also, it is within the scope of the invention to produce only a partial row such as, for example, every other desired orificed projection during each stamping.

During forming, the punches move into the die holes 46. As the workpiece is indexed to produce a new series of orificed projections, a portion of the projections that has been produced can be nested in holes 47 for protection during subsequent punching operations on the plate. During the pressing operation, pressure plate 23 moves down to press the workpiece between the pressure plate and lands 48.

As shown, the extruding die has two sets of holes. The outside set of holes 28 and 30 is shown to have locating pins 50 and 52 positioned therein, respectively. The inside set of holes 29 and 30 is used when the locating pins 50 and 52 are to be moved therein during the operation of producing an orificed container as will be discussed later.

With reference to FIG. 3, workpiece 32 has a first and second set of locating holes. The first set has one row of round holes 34 and one row of oval holes 36. The second set has one row of round holes 35 and one row of oval holes 37. The orificed projections are formed in area 38 between the round and oval holes of the workpiece.

The following is a description of the forming of a plate having orificed projections. First, the locating pins are positioned in one set of holes such as outside holes 28 and 30. Workpiece 32 is positioned in the punch press such that pin 28 projects through a first round hole of the set 34 and the other pin 30 projects through a first oval hole of the set 36. The punch press is then conventionally operated to form a first row of orificed projections in the workpiece between the first round hole and the first oval hole of the first set of locating holes. Subsequently, the workpiece is moved so that pin 28 projects through a second locating hole of the row 34 and the other pin projects through a second oval locating hole of row 36. The punch press then conventionally forms a second row of orificed projections in the workpiece between the second round hole and the second oval hole of the first set. This can be continued until the pins have been positioned in each of the holes 34 and 36 to produce the desired rows of orificed projections therebetween. It is advantageous that one of the rows, such as row 36, has holes which are elongated, such as oval or rectangular in shape, to accommodate any stretching of the workpiece across its width during forming of the orificed projections. The locating pins 50 and 52 are subsequently moved to the other set of holes 29 and 31, respectively, in the extruding die. Workpiece 32 is then positioned within the punch press such that pin 50 projects into one of the round locating holes of row 35 and the other pin 52 projects into one of the oval locating holes of row 37. With the workpiece thus positioned, an additional or third row of orificed projections is formed in the workpiece between the first round hole and the first oval hole of the second set. This third row of orificed projections is located between the first row and the second row of the formed orificed projections.

Punching two rows of orificed projections at one time has been found satisfactorily. However, it is understood that a single row or only a portion of a single row of orificed projections can be formed at one time.

Once the rows of orificed projections have been formed in area 38 of the workpiece, a portion of the workpiece containing the round holes 34 and 35 and a portion containing the oval holes 36 and 37 are trimmed therefrom.

The use of the locating holes in the workpiece eliminates the need of the blister die in the prior art process. Thus, the expense of the blister die is eliminated and variability is greatly reduced as the operator is no longer required to visually position the workpiece by use of the small blisters or projections produced in the blister die operation. The workpiece can be uniformly and positively positioned in the punch press by the use of the locating pins and locating holes, and thus, operator error is reduced. During the forming operation, the workpiece can stretch three to five percent. The stretching across the width is not a problem because a row or series of projections along a row are produced at one time. Also, as discussed above, it is advantageous to have one of the rows of locating holes to be of an elongated shape such as an oval shape to accommodate the stretching across the width. If conventional numerical automatic feed indexing equipment were used, the three to five percent stretching in the length direction would be a problem. Thus, such standard indexing equipment would not be satisfactory in this operation. However, by using the rows of locating holes along the length of the workpiece, the longitudinal stretching of the workpiece is not a problem because the stretching of the workpiece is minimal between each locating hole.

Having described the invention in detail, it will be understood that such specifications are given for the sake of explanation. Various modifications and substitutions other than those cited may be made without departing from the scope of the invention as described in the following claims.

INDUSTRIAL APPLICABILITY

The present invention would be useful in the mineral fiber-forming art and, in particular, in the glass fiber-forming art.

What is claimed is:

1. A method of producing a stream feeder for flowing streams of molten mineral material from which filaments are attenuated comprising:
   a. providing two round locating pins;
   b. providing a workpiece which has two rows of locating holes wherein one row has round holes adapted to fit snugly around one of the round locating pins and the other row has elongated holes, the elongated holes being adapted to accommodate for the stretching of the workpiece between the rows of locating holes from formation of orificed projections;
   c. locating the workpiece such that one of the pins enters a first locating hole of one row and the other pin enters first locating hole of the other row;
   d. forming a first row of orificed projections in the workpiece between the first locating hole of the one row and the first locating hole of the other row;
   e. subsequently locating the workpiece such that the pin enters a second locating hole of the one row and the other pin enters a second locating hole of the other row; and
   f. forming a second row of orificed projections in the workpiece between the second locating hole of the one row and the second locating hole of the other row.

2. The method of claim 1 further comprising trimming portions from the workpiece which contains the rows of locating holes.

3. A method of producing a stream feeder for flowing streams of molten glass material from which glass filaments are attenuated comprising:
   a. providing two round locating pins;
   b. providing a workpiece which has a first and second set of locating holes wherein each set has one row of round holes adapted to fit snugly around one of the round locating pins and one row of elongated holes, the elongated holes being adapted to accommodate for the stretching of the workpiece between the rows of locating holes from the formation of orificed projection;
   c. locating the workpiece such that one of the pins enters a first round hole of the first set and the other pin enters a first elongated hole of the first set;
   d. punching a first row of orificed projections in the workpiece between the first round hole and the first elongated hole of the first set;
   e. subsequently locating the workpiece such that one of the pins enters a second round hole of the first set and the other pin enters a second elongated hole of the first set;
   f. punching a second row of orificed projections in the workpiece between the second round hole and the second elongated hole of the first set;
   g. subsequently locating the pins and the workpiece such that one of the pins enters a first round hole of the second set and the other pin enters a first elongated hole of the second set;
   h. punching a third row of orificed projections in the workpiece between the first round hole and the first elongated hole of the second set, the third row of orificed projections being located between the first row and the second row; and
   i. trimming a portion which contains the round holes and a portion which contains the oval holes from the workpiece.

4. Apparatus for producing a stream feeder for flowing streams of molten mineral material from which filaments are attenuated comprising:
   a. two round locating pins;
   b. means for locating a workpiece having two rows of locating holes such that one of the pins enters a first locating hole of one row and the other pin enters first locating hole of the other row, one row having round holes adapted to fit snugly around one of the round locating pins and the other row having elongated holes, the elongated holes being adapted to accommodate for the stretching of the workpiece between the rows of locating holes from the formation of orificed projections;
   c. means for forming a first row of orificed projection in the workpiece between the first locating hole of the one row and the first locating hole of the other row;
   d. means for subsequently locating the workpiece such that one of the pins enters a second locating hole of the one row and the other pin enters a second locating hole of the other row; and
   e. means for forming a second row of orificed projections in the workpiece between the second locating hole of the one row and the second locating hole of the other row.

5. Apparatus for producing a stream feeder for flowing streams of molten glass material from which glass filaments are attenuated comprising:
   a. two round locating pins;
   b. means for locating a workpiece having a first and second set of locating holes wherein each set has one row of round holes adapted to fit snugly around one of the round locating pins and one row of elongated holes such that one of the pins enters a first round hole of the first set and the other pin enters first elongated hole of the first set, the elongated holes being adapted to accommodate for the stretching of the workpiece between the rows of locating holes from the formation of orificed projections;
   c. means for forming a first row of orificed projections in the workpiece between the first round hole and the first elongated hole of the first set;
   d. means for subsequently locating the workpiece such that one of the pins enters a second round hole of the first set and the other pin enters a second elongated hole of the first set;
   e. means for forming a second row of orificed projections in the workpiece between the second round hole and the second elongated hole of the first set;
   f. means for subsequently locating the pins and the workpiece such that one of the pins enters a first round hole of the second set and the other pin enters a first elongated hole of the second set; and
   g. means for forming a third row of orificed projections in the workpiece between first round hole and the first elongated hole of the second set, the third row of orificed projections being located between the first row and the second row.

* * * * *